(12) United States Patent
Wang et al.

(10) Patent No.: US 7,885,011 B1
(45) Date of Patent: Feb. 8, 2011

(54) OBJECTIVE FOR OPTICAL IMAGING SYSTEMS

(75) Inventors: Xinghua Wang, Niskayuna, NY (US); Mark Marshall Meyers, Niskayuna, NY (US); Siavash Yazdanfar, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/543,785

(22) Filed: Aug. 19, 2009

(51) Int. Cl.
G02B 21/02 (2006.01)
G02B 13/18 (2006.01)

(52) U.S. Cl. ..................... 359/661; 359/716

(58) Field of Classification Search ............... 359/661, 359/716, 753, 784
See application file for complete search history.

(56) References Cited

U.S. PATENT DOCUMENTS

| | | |
|---|---|---|
| 4,037,938 A | 7/1977 | Yamashita et al. |
| 4,042,295 A | 8/1977 | Yamasita et al. |
| 4,059,344 A | 11/1977 | Yamasita |
| 5,493,441 A | 2/1996 | Chipper |
| 5,543,966 A | 8/1996 | Meyers |
| 5,563,966 A | 10/1996 | Ise et al. |
| 5,691,847 A | 11/1997 | Chen |
| 5,731,914 A | 3/1998 | Meyers |
| 5,748,372 A | 5/1998 | Kitagawa |
| 5,768,030 A | 6/1998 | Estelle et al. |
| 5,880,879 A | 3/1999 | Foo |
| 5,923,479 A | 7/1999 | Nagata |
| 5,966,244 A | 10/1999 | Mukai et al. |
| 5,978,159 A | 11/1999 | Kamo |
| 5,999,327 A * | 12/1999 | Nagaoka .................... 359/654 |
| 6,034,819 A | 3/2000 | Ogata |
| 6,088,322 A | 7/2000 | Broome et al. |
| 6,122,104 A | 9/2000 | Nakai |
| 6,618,205 B2 | 9/2003 | Murayama |
| 6,741,403 B2 | 5/2004 | Huang |
| 6,825,979 B2 | 11/2004 | Ogawa |
| 6,950,241 B1 | 9/2005 | Liang |
| 7,023,622 B2 | 4/2006 | Liang |
| 7,180,686 B2 | 2/2007 | Kato |

FOREIGN PATENT DOCUMENTS

WO 0224058 A2 3/2002

* cited by examiner

Primary Examiner—William C Choi
(74) Attorney, Agent, or Firm—Jenifer R. Haeckl

(57) ABSTRACT

A wide angle hybrid refractive-diffractive endoscope objective is provided. The objective comprises a negative meniscus lens having a first surface and a second surface; a stop adjacent to the negative meniscus lens; a positive lens adjacent to the negative lens and having a first surface and a second surface; and a hybrid refractive-diffractive element adjacent to the positive lens and having a first surface and a second surface, wherein one of the first surface, or the second surface comprises a diffractive surface, wherein the objective has an effective focal length in a range from about 0.8 mm to about 1.6 mm.

17 Claims, 5 Drawing Sheets

OBJECTIVE FOR OPTICAL IMAGING SYSTEMS

BACKGROUND

The invention relates generally to the field of endoscopic imaging and more specifically, to the field of optical design of compact high collection power endoscopic objectives for fluorescence and white light imaging.

Fluorescence imaging is used to highlight molecules and structures not otherwise visible under white light illumination. By administering a molecular contrast agent to a patient, disease processes can be specifically labeled for visualization during clinical examination. In concert with white light imaging, fluorescence imaging captures movies of anatomy with tissue specific information, and provides the clinician with a macroscopic visualization of biology in its intact and native physiological state. It holds promise as a way for real time guidance for tumor resection, sentinel lymph node mapping, vasculature and tissue perfusion imaging, as well as early detection of colorectal cancer.

However, many technical challenges are still present. One of the challenges is the specificity and affinity of the contrast agent. With respect to the physics of imaging, a challenge is light attenuation in living tissue. Yet another challenge is the sensitivity of the imaging instrument at low light conditions.

Light attenuation in tissue, is related to the spectroscopic properties of the biological medium and the optical properties of the fluorescent contrast agent, or fluorophore. Shifting the emission wavelength of the fluorophore from the visible to the deep red or near infrared (NIR) improves visualization by providing better rejection of ambient light and deeper penetration depth into tissue. For example, in addition to water, the tissue constituents that dominate absorption of light in the visible and NIR are hemoglobin, bilirubin, and lipids, which have absorption minima in the red to NIR. Moreover, there is a substantial decrease in tissue scattering in the NIR relative to visible wavelengths. The reduced absorption and scattering (collectively known as the attenuation coefficient) results in less light attenuation and thus deeper penetration. Imaging in the NIR minimizes background autofluorescence, as most of the endogenous fluorescent species (e.g., collagen, elastin, NAD(P)H) emit in the visible spectrum.

The required sensitivity of the system depends on whether a targeted or non-targeted agent is used. Some clinical procedures do not require specific molecular targeting. For example, during cholecystectomy, an uncommon but potentially serious complication with the procedure is injury to the common bile duct. For this application, a targeted contrast agent, such as methylene blue, can be used to highlight the bile duct to give the surgeon guidance during the procedure. Such agents can be introduced with relatively high concentration, and are not limited by the local update of the dye. Other non-targeted applications include sentinel lymph node mapping, and highlighting of vasculature and tissue perfusion.

However, imaging of targeted agents, requires higher sensitivity to detect low levels of the agent. Regardless of the dose orally, intravascularly, or otherwise administered to the patient, local concentrations of the contrast agent can be on the order of tens of nmol/L.

The imaging instrument sensitivity is determined by collection efficiency, illumination power density at the sample, and detector sensitivity. The entrance pupil diameter (EPD) of the primary optics, which determines the numerical aperture (NA), impacts collection efficiency. In an endoscopic imaging system, the EPD is normally 0.2 mm. At 25-100 mm working distance, the NA may be on the order of 0.002-0.008, resulting in low collection power. The illumination power can be partially increased to compensate for that loss in collection efficiency, but only up to the point of maximum permissible exposure (MPE), dictated by ANSI-Z-136.1. Another practical consideration is limiting the excitation light source to a Class III device (<500 mW exposure in the NIR) to avoid the use of laser interlocks and personal protective equipment. However, to illuminate a wide field of view of 120°, the irradiance at the sample provided by a Class III excitation source can be very low (<2.5 mW/cm2). On the detector side, the majority of video endoscopes use ¼ inch or ⅙ inch detectors, which have small pixels, resulting in very low sensitivity.

Conventional endoscope objectives use a retrofocus objective designed to cover large fields of view (FOV). Generally, a small entrance pupil diameter (EPD) is used to maintain large depth of field, and to reduce aberrations at large field. Although this is normally adequate for white light imaging, it is not optimized for fluorescence imaging, where the typical fluorescence signal strength from stained tissue is substantially weaker than the white light reflectance image. It is advantageous for an objective intended for dual use of white light and fluorescence imaging to improve collection power, while maintaining a small overall diameter, large FOV, and high optical resolution for both visible and near infrared wavelengths.

It is therefore desirable to provide a compact endoscope objective with high collection power for multi-mode endoscope systems.

BRIEF DESCRIPTION

In one embodiment, a wide angle hybrid refractive-diffractive endoscope objective is provided. The objective comprises a negative meniscus lens having a first surface and a second surface; a stop adjacent to the negative meniscus lens; a positive lens adjacent to the negative lens and having a first surface and a second surface; and a hybrid refractive-diffractive element adjacent to the positive lens and having a first surface and a second surface, wherein one of the first surface, or the second surface comprises a diffractive surface, wherein the objective has an effective focal length in a range from about 0.8 mm to about 1.6 mm.

In another embodiment, a wide angle hybrid refractive-diffractive endoscope objective is provided. The objective comprises a negative meniscus lens having a first surface and a second surface; a stop adjacent to the negative meniscus lens; a positive lens adjacent to the negative lens and having a first surface and a second surface; and a hybrid refractive-diffractive element adjacent to the positive lens and having a first surface and a second surface, wherein one of the first surface, or the second surface comprises a diffractive surface, wherein the objective has an effective focal length in a range from about 0.8 mm to about 1.6 mm, and wherein the objective is employed in an endoscope, a handheld probe, or a borescope.

In yet another embodiment, a system for optical imaging is provided. The system comprises an optical endo scope comprising: one or more illumination sources for producing a visible light and an excitation light, wherein the excitation light is configured to induce luminescence in an specimen; an objective for directing the visible light and the excitation light in a direction of the specimen, wherein the objective comprises: a negative meniscus lens having a first surface and a second surface; a stop adjacent to the negative meniscus lens; a positive lens adjacent to the negative lens and having a first surface and a second surface; a hybrid refractive-diffractive element adjacent to the positive lens and having a first surface and a second surface, wherein one of the first surface, or the second surface comprises a diffractive surface, wherein the objective has an effective focal length in a range from about 0.8 mm to about 1.6 mm; a single detector in operative association with the one or more illumination sources for detecting luminescent light and visible light emitted from the specimen; and a signal processor for processing signals corresponding to the endo scope.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
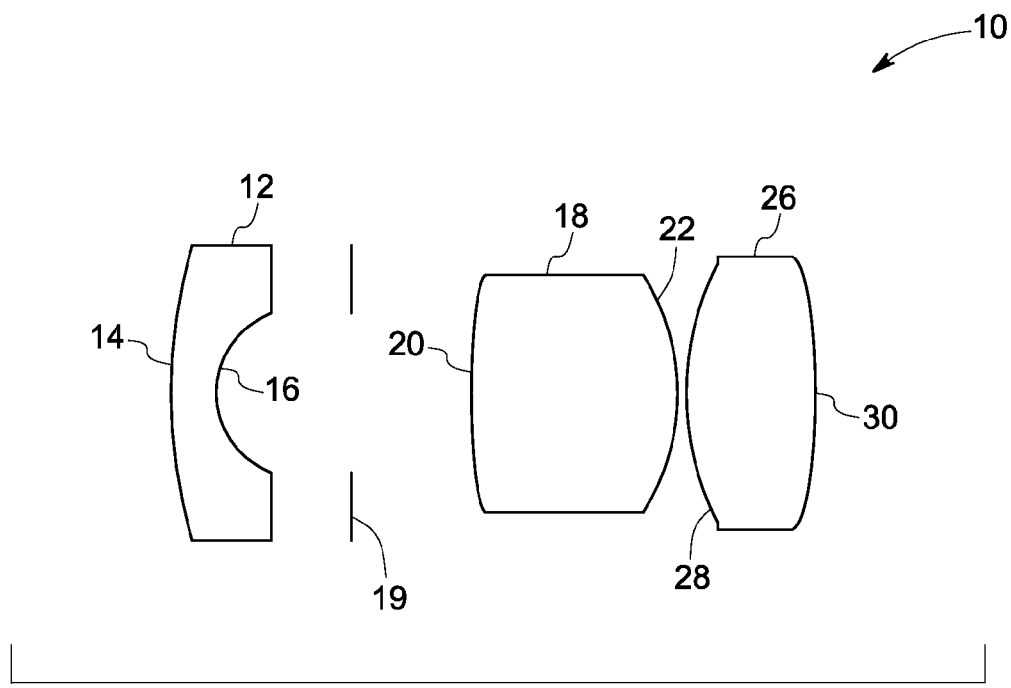
FIGS. 1-2 are cross sectional views of endo scope objectives, in accordance with embodiments of the present technique.

Embodiments of the invention relate to a wide angle hybrid refractive-diffractive endoscope objective for optical imaging systems. In certain embodiments, a hybrid refractive-diffractive element is employed to increase the entrance pupil diameter (EPD) of a wide angle fisheye lens, thus achieving higher collection power and maintaining small overall diameter. The entrance pupil diameter (EPD) of the objective may be greater than about 0.6 mm. As used herein the term "entrance pupil diameter" means the diameter of a virtual aperture that defines the area at the entrance of the optical system that can accept light rays, such that the rays that pass through the pupil are able to enter the optical system and pass through the optical system through the exit. Collection power of a lens is proportional to the square of the EPD, therefore, the objective of the invention has about 9 to 25 times higher collection power than conventional endoscope objectives which have EPD of about 0.2 mm. In certain embodiments, the objective is adapted to capture fluorescence signal for visible or near infrared wavelengths, or both.

In certain embodiments, the wide angle hybrid refractive-diffractive endoscope objective employs a negative meniscus lens having a first surface and a second surface; a stop adjacent to the negative meniscus lens; a positive lens adjacent to the negative lens and having a first surface and a second surface; and a hybrid refractive-diffractive element adjacent to the positive lens and having a first surface and a second surface, wherein one of the first surface, or the second surface comprises a diffractive surface, wherein the objective has an effective focal length in a range from about 0.8 mm to about 1.6 mm. As used herein, the term "adjacent to" encompasses instances where a gap may exist between the two elements that are being referred to as being adjacent to, that is, the two elements may not be in physical contact. In one embodiment, the stop is located adjacent to the second surface of the negative meniscus lens. In one embodiment, the positive lens is disposed adjacent to the stop such that the first surface of the positive lens is closer to the stop. In one embodiment, the hybrid refractive-diffractive element is disposed adjacent to the positive lens.

In certain embodiments, the objective may have an effective focal length in a range from about 0.8 mm to about 1.6 mm. As used herein the term "effective focal length" refers to the distance from the principal point to the focal point. The focal length of an optical system is a measure of how strongly the system converges (focuses) or diverges (defocuses) light. A system with a shorter focal length has greater optical power than one with a long focal length; that is, it bends the pencil of rays more strongly, bringing them to a focus in a shorter distance. For applications, such as endoscopy where it is desirable to have a large angular field-of-view, it is desirable to have small effective focal length. In one embodiment, the effective focal length of the hybrid refractive-diffractive element is greater than about 1 mm. In certain embodiments, a full field of view (FFOV) of the endoscope is in a range from about 60 degrees to about 170 degrees.

Typically, for endoscope objective, chromatic aberration is minimized by using a cemented doublet element. However, the correction for chromatic aberration using a cemented doublet is not very effective when the EPD is larger than 0.5 mm. Such a cemented doublet is also difficult to manufacture and results in a large objective thickness. It would be advantageous to improve chromatic aberration without the use of a cemented doublet.

To substantially increase the collection power of the endoscope, while maintaining a wide FFOV, as well as large depth of field and compactness, better correction for chromatic aberration is required. In certain embodiments, the wide-angle hybrid refractive-diffractive endoscope objective exhibits an improved correction for chromatic aberration while maintaining a wide FFOV, large depth of field and compactness due to the fact the effective Abbe number for a diffractive surface is negative as compared with a conventional achromatic doublet uses glass element where the Abbe number is positive. In these embodiments, the hybrid refractive-diffractive element uses a combination of refractive and diffractive surfaces to effectively correct for chromatic and spherical aberration. The refractive surface may be a spherical or an aspherical surface.

In one example, the chromatic aberration of the light introduced by a refractive portion of the lens is at least about 150 nm range may be corrected by a diffractive portion, which is incorporated into the lens, thereby providing an improved hybrid refractive-diffractive lens for the objective. In addition, the hybrid refractive-diffractive element enables the endoscope to minimize and correct chromatic aberration, coma, astigmatism and Petzval field curvature.

Figure 2:
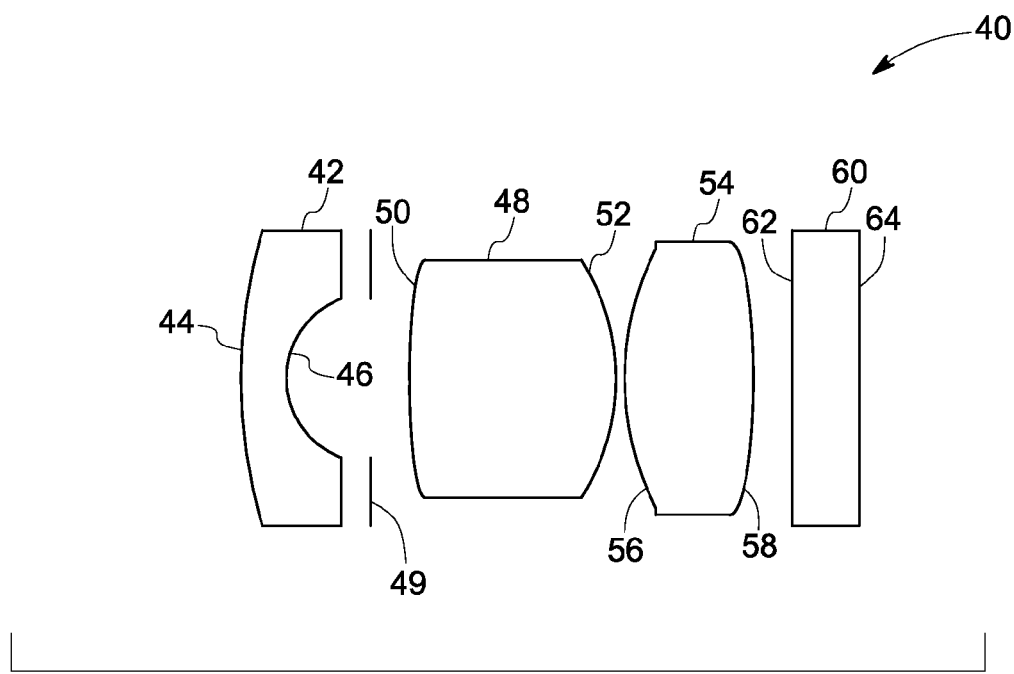
Figure 5:
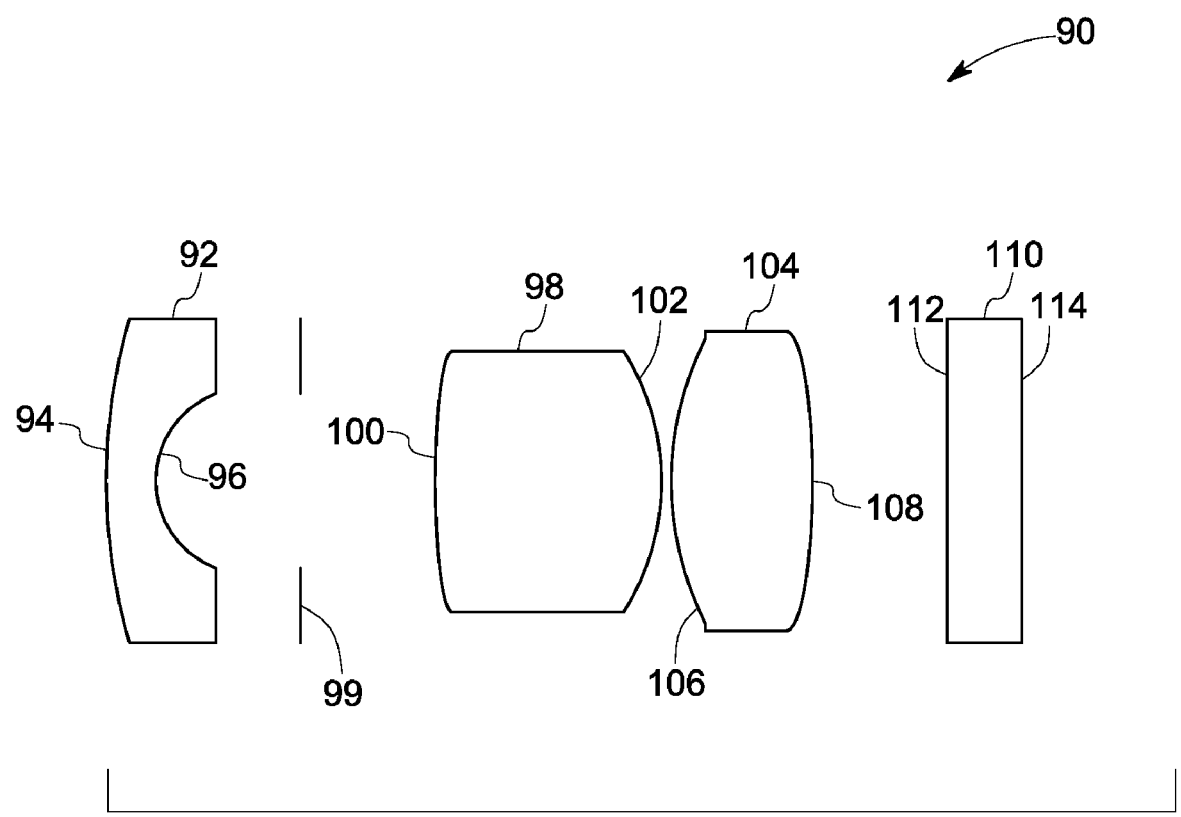
FIG. 5 is a cross sectional view of an endoscope objective, in accordance with embodiments of the present technique.

The hybrid refractive-diffractive element may take different forms as illustrated, for example, in FIGS. 1-2 and 5. In one embodiment, the aspherical surface of the hybrid refractive-diffractive element is expressed by the Equation 1.

$$z = \frac{ch^2}{1 + \sqrt{(1-(1+k)c^2h^2)}} + Ah^2 + Bh^6 + Ch^8 + Dh^{10} \qquad \text{Equation 1}$$

where c is the curvature of the curved surface measured along the radial coordinate h from a point on an optical axis, and k is the conic constant of the aspherical surface, and A, B, C and D are higher order coefficients.

In one embodiment, the diffractive surface of the hybrid refractive-diffractive element is expressed by the Equation 2.

$$z = \frac{2\pi}{\lambda_{nominal}}[c_1 h^2 + c_2 h^4 + c_3 h^6]$$ Equation 2 wherein $\lambda_{nominal}$ is a wavelength in the center of a spectral range, $c_1$, $c_2$ and $c_3$ are phase forms.

The negative meniscus lens, the positive lens, and the hybrid refractive-diffractive element are made from optically transmissive material having an index of refraction of at least 1.29. Suitable optically transmissive material may include a rigid material, such as glass, or a moldable material such as optical plastic, which is cheaper and easier to mold as compared to glass.

While using a glass substrate, the most manufacturable configuration is a flat diffractive surface. Whereas, for plastic molded elements it is feasible to make a curved diffractive surface. A curved diffractive surface provides additional freedom in the design for better aberration correction. In one example, a multi-layer diffractive grating may be used to achieve high diffraction efficiency over a large wavelength range. Suitable material for forming curved surface may include any moldable material such as optical plastic (for example, polystyrene, acrylic, cyclic olefin copolymer (COC), polycarbonate) or glass. If the lens element will be molded, a plastic material is more preferable as it is cheaper and easier to mold. Alternatively, if the lens is not to be molded, a diffractive zone pattern may be diamond turned or cut on the lens surface.

Referring now to FIG. 1, an objective 10 is illustrated. In the illustrated embodiment, a negative meniscus lens 12 comprises a first surface 14 and a second surface 16. A positive lens 18 having a first surface 20 and a second surface 22 is disposed adjacent to the meniscus lens. Both the first and second surfaces 20 and 22 of the positive lens 18 are curved surfaces with same or different radii of curvature. A stop 19 may be disposed between the negative meniscus lens 12 and the positive lens 18. A hybrid refractive-diffractive element 26 is disposed adjacent to the positive lens 18. The hybrid refractive-diffractive element 26 has a first surface 28 and a second surface 30. The first surface 28 is a refractive surface, whereas the second surface 30 is adapted for diffractive purposes.

Although not illustrated, the arrangement 10 may also include an optical filter, such as a laser rejection filter or an emission filter, or both. The filter may be disposed adjacent to the hybrid element 26 on the side closer to the diffractive surface 30.

In one example, the effective focal length of the objective 10 is 1 mm, the entrance pupil diameter is 0.8 mm, the F number (FNO) is 1.25, and the full field of view is 150 degrees. The focal length of the negative meniscus 12 is 1.83 mm, focal length of the positive lens 18 is 3.16 mm, focal length of the hybrid element 26 is 2.96 mm. The maximum image height (IH) is 1.50 mm. Exemplary dimensions and spacings are set forth in Table 1.

TABLE 1

| Reference No. of Surface | Radius (mm) | Thickness (mm) | Glass Type |
|---|---|---|---|
| 14 | 9.40607 | 0.400 | 696283.4919 |
| 16 | 1.10000 | 1.402 | |

TABLE 1-continued

| Reference No. of Surface | Radius (mm) | Thickness (mm) | Glass Type |
|---|---|---|---|
| 20 | 7.49599 | 2.690 | 743972.4485 |
| 22 | −2.88759 | 0.100 | |
| 28 | 2.92351 | 1.436 | 620410.6032 |
| 30 | −6.49334 | 0.200 | |
| 19 | | 0.100 | |

Turning to FIG. 2, an alternate embodiment of the objective is illustrated. In the illustrated embodiment, the objective 40 comprises a negative meniscus lens 42 having a first surface 44, which is convex, and a second surface 46 that is concave. The arrangement 40 further includes a positive lens 48 having a planar first surface 50, and a convex second surface 52. A stop 49 may be disposed between the negative meniscus lens 42 and the positive lens 48. A hybrid refractive-diffractive element 54 is disposed adjacent to the positive lens 48. The hybrid element 54 has a refractive first surface 56, which is aspherical or spherical in shape, and a diffractive second surface 58, which is curved. The hybrid element may be made of COC. Optionally, a color filter 60 having surfaces 62 and 64 may be disposed adjacent to the hybrid element 54 on the side closer to the diffractive surface 58.

In one example, the effective focal length of the objective 40 is 1.25 mm, the entrance pupil diameter is 1.0 mm, the F number (FNO) is 1.25, and the full field of view is 170 degrees. The focal length of the negative meniscus 42 is 2.128 mm, focal length of the positive lens 48 is 3.682 mm, focal length of the hybrid element 54 is 3.41 mm. The maximum image height (IH) is 1.50 mm. Exemplary dimensions and spacings are set forth in Table 2.

TABLE 2

| Reference No. of Surface | Radius (mm) | Thickness (mm) | Glass Type |
|---|---|---|---|
| 44 | 9.40607 | 0.400 | 598228.5442 |
| 46 | 1.10000 | 1.100 | |
| 50 | 208.92464 | 2.897 | 749993.3352 |
| 52 | −2.76496 | 0.100 | |
| 56 | 4.08629 | 1.946 | 590000.309 |
| 58 | −5.06152 | 0.200 | |
| 62 | Infinity | 1.500 | 458500.678 |
| 64 | Infinity | 0.999 | |
| 49 | NA | 0.100 | NA |

Figure 3:
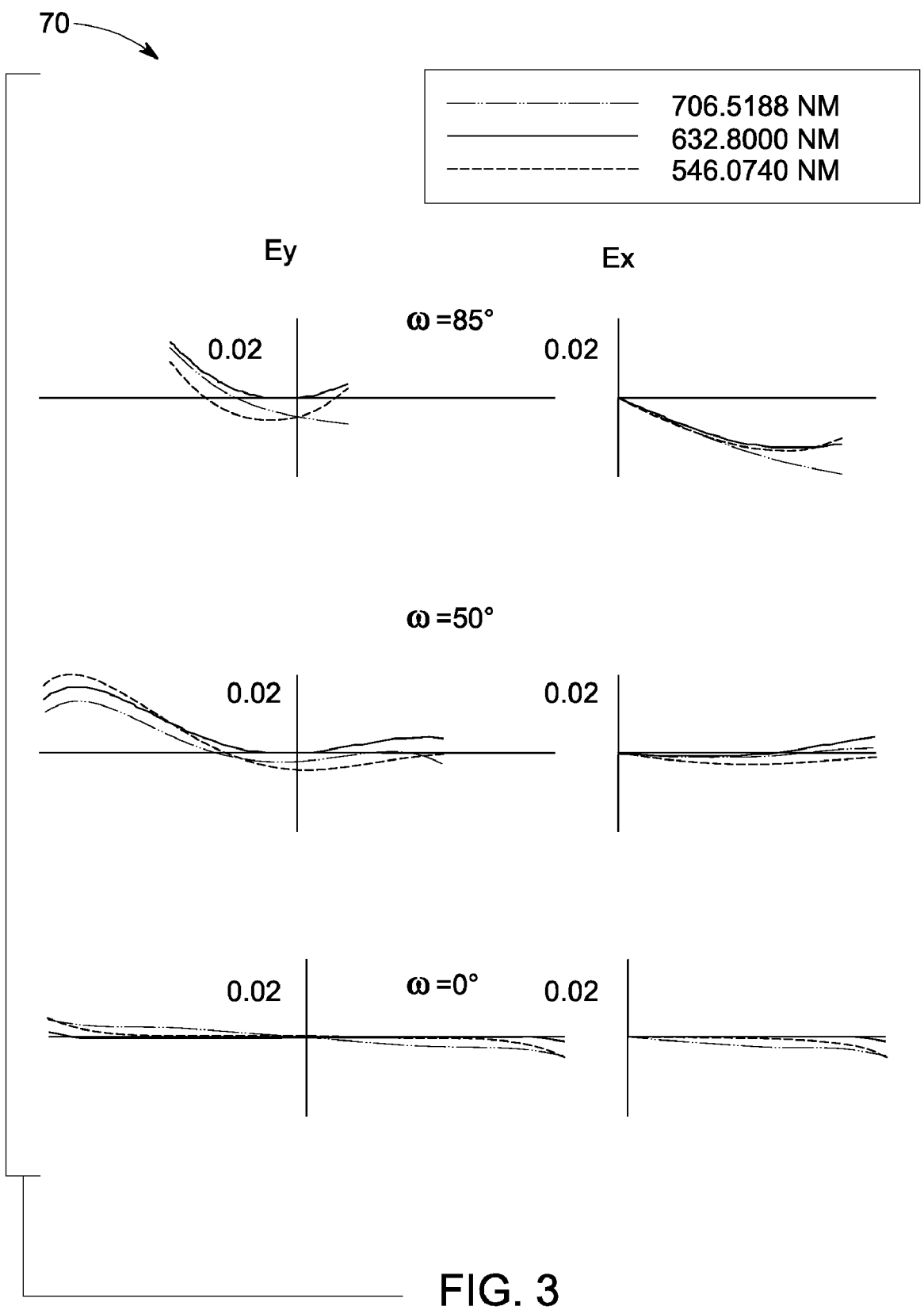
FIG. 3 is a graphical representation of aberrations occurring for the objective of FIG. 2.

FIG. 3 illustrates ray aberration curves 70 for the aberrations occurring in the objective 40 of FIG. 2. The aberration curves are illustrated for three different wavelengths of light employed for exciting the specimen. In the illustrated embodiment, the three different wavelengths are about 706 nm, about 632 nm, and about 546 nm.

Figure 4:
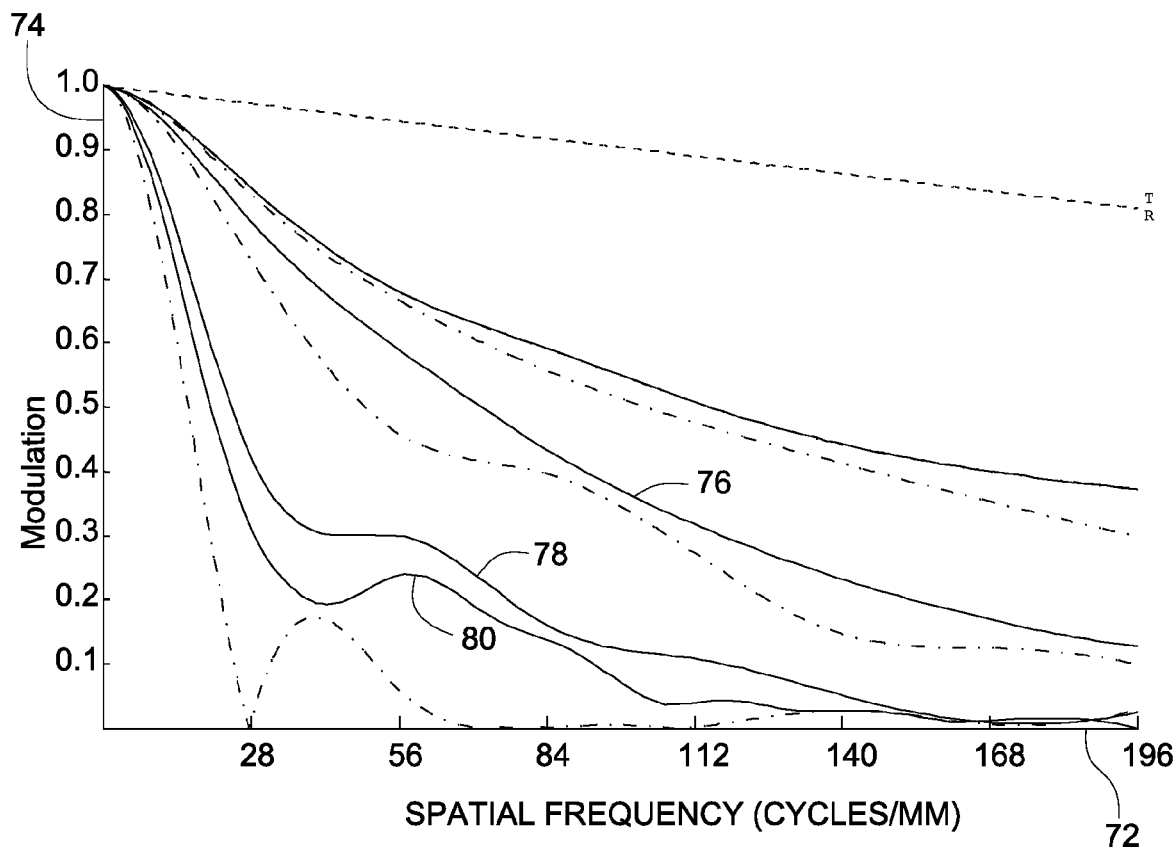
FIG. 4 is a graphical representation of a modulation transfer function for the objective, in accordance with embodiments of the present technique.

FIG. 4 illustrates modulation transfer function (MTF) for the objective of FIG. 2. The abscissa 72 represents spatial frequency, and the ordinate 74 represents the MTF. The curves represent relative modulation of the image on the CCD plane vs the original object for different wavelengths of light. The curves 76, 78 and 80 are MTF plots for wavelengths 706 nanometers, 632 nanometers and 486 nanometers, respectively.

FIG. 5 illustrates an objective 90. In the illustrated embodiment, a negative meniscus lens 92 comprises a first surface 94 and a second surface 96, a positive lens 98 having a first surface 100 and a second surface 102, and a hybrid refractive-diffractive element 104 having a refractive first surface 106 and a diffractive second surface 108. Further, a stop 99 may be disposed between the negative meniscus lens 92 and the positive lens 98. In the illustrated embodiment, the diffractive second surface 108 is a planar surface. In one embodiment, diffractive grating may be coupled on the surface of the element 104 to form the diffractive second surface 108. The diffractive grating may have sawed edges. Optionally, a color filter 110 having surfaces 112 and 114 may be disposed adjacent to the hybrid element 104 on the side closer to the diffractive surface 108.

In one embodiment, the effective focal length of the objective is 1.40 mm, the entrance pupil diameter is 0.8 mm, the F number (FNO) is 1.75, and the full field of view is 120 degrees. The focal length of the negative meniscus 92 is 2.037 mm, focal length of the positive lens 98 is 3.682 mm, focal length of the hybrid element 104 is 4.92 mm. In the present embodiment, the hybrid element may be made of cyclic olefin copolymer (COC). The maximum image height (IH) is 1.53 mm. Exemplary dimensions and spacings are set forth in Table 3.

TABLE 3

| Reference No. of Surface | Radius (mm) | Thickness (mm) | Glass Type |
|---|---|---|---|
| 94 | 9.40607 | 0.400 | 717000.48 |
| 96 | 1.23493 | 1.714 | |
| 100 | 5.22337 | 2.763 | 694978.4933 |
| 102 | −3.02904 | 0.156 | |
| 106 | 3.86253 | 1.607 | 620410.6032 |
| 108 | Infinity | 0.100 | |
| 112 | Infinity | 1.500 | 458500.678 |
| 114 | Infinity | 0.235 | |
| 99 | NA | 0.100 | NA |

In certain embodiments, a system for optical imaging may include an optical endoscope comprising one or more illumination sources for directing a visible light and an excitation light towards a specimen, the excitation light configured to induce luminescence in the specimen, and a single detector in synchronization with the one or more illumination sources for detecting visible light scattered or reflected from the specimen and luminescent light emitted via luminescence, and a signal processor for processing signals from the endoscope.

In one embodiment, the objective enables the capture of both reflected light (e.g., visible or near infrared light) and luminescence (e.g., visible or near infrared light) using only a single detector. Moreover, in certain embodiments, the objective enables collection of light from two or more optical imaging modalities (white light and luminescent light) simultaneously and in real time. Further, the endo scope of one or more of the embodiments may be coupled with a dedicated video processor and contrast agents specific to different clinical applications for enhanced imaging and diagnosis.

Figure 6:
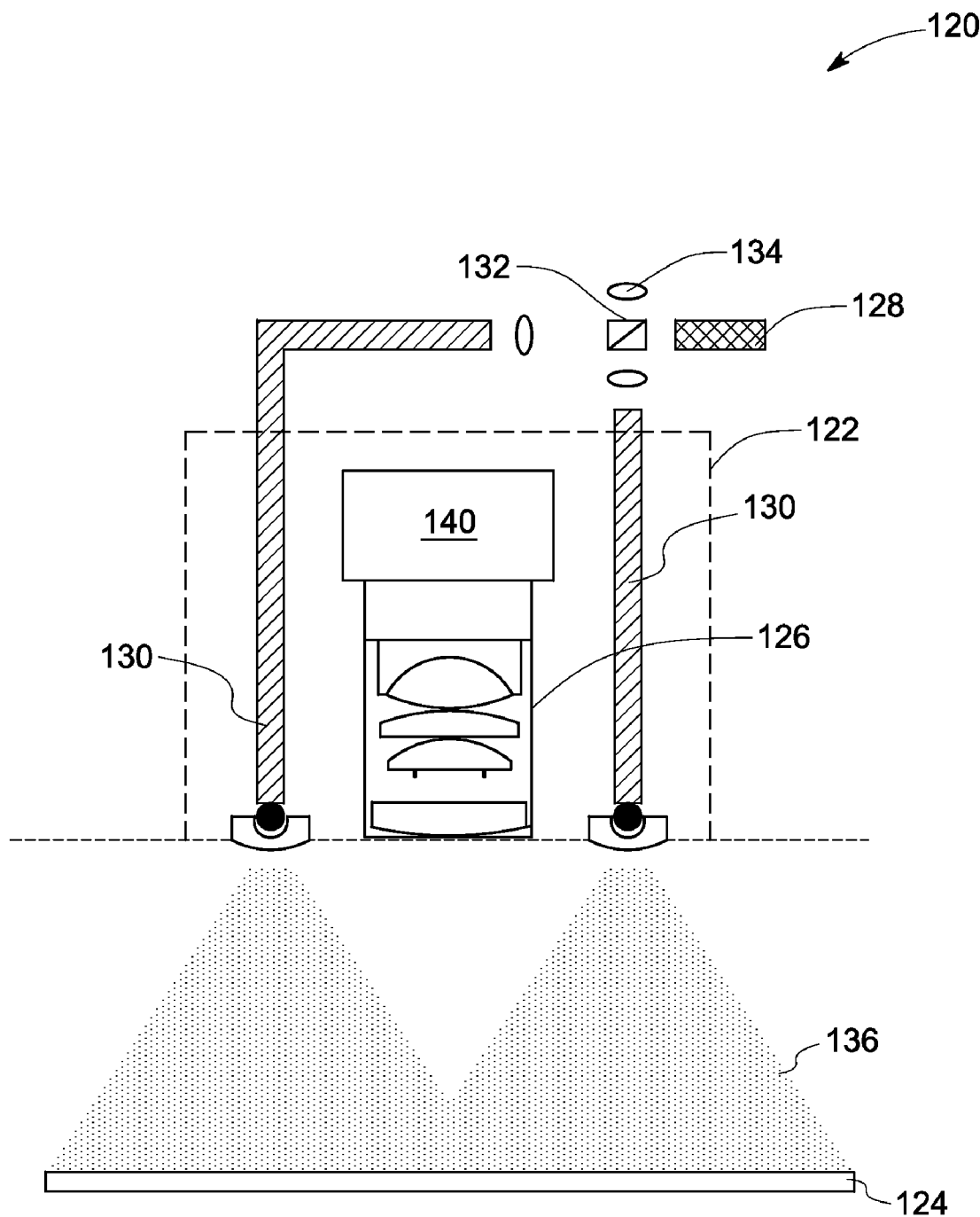
FIG. 6 is a schematic diagram of endo scope employing the objective of the present technique.

FIG. 6 is a schematic diagram of an exemplary embodiment of the endoscope of the invention. In the illustrated embodiment, the endoscope 120 includes a probe 122 and a body. The probe 122 may be coupled to the body via a flexible cable. The probe 122 is guided inside a cavity to be inspected, such as digestive or respiratory tract of a human body towards a specimen 124 to be imaged or examined during a medical procedure. Other subjects, such as luggage, packages, and other articles of manufacture, may be inspected using the endo scope 120.

The body comprises one or more illumination sources 128 for emitting light corresponding to two or more optical imaging modalities and directing the emitted light towards the specimen 124 (i.e., the section of the body to be examined) via a light delivery and collection subsystem. The light delivery and collection subsystem include fiber optic cables 130 and objective 126 of the present technique. In addition to the objective 126, the light delivery and collection subsystem may include additional optical devices such as lenses, prisms, mirrors, and so forth. In the illustrated embodiment, the additional optical devices include dichroic mirror 132, and condenser optics 134. The illumination source 128 may be any broadband source such as light-emitting diodes, super-luminescent diodes, broadened laser sources, tunable light sources, monochromatic light source, polychromatic light source, laser, and so forth. Any optical imaging modalities may be employed including a white light imaging, a narrow-band brightfield imaging, a luminescence imaging, or a near infrared imaging.

In certain embodiments, the illumination sources illuminate the specimen 124 with a visible light and an excitation light. The excitation light may be a wavelength selected to induce luminescence in the specimen 124 via intrinsic luminescence. Alternatively, the excitation light may be a wavelength selected to induce luminescence in a luminescence agent administered to the subject so as to come into contact with the specimen 124.

The specimen 124 may scatter or emit light detectable by two or more optical modalities upon being illuminated by the light 136. As noted above, the light may be emitted from the specimen 124 via agent-induced luminescence or auto-luminescence. The light emitted by luminescence may be in near infrared spectral region or in near ultraviolet spectral region based on the specimen 124 and the type of luminescence agent administered into the specimen 124. The scattered and/or emitted light may be detected via a single detector 140, such as a CCD detector or a CMOS detector. To achieve high resolution imaging with a ⅙ inches CCD where the effective pixel spacing is 3.6 microns, the optical resolution of the system needs to be high enough to match the small pixel size of the detector. In one example, at a wavelength of 850 nm, the F number (f/#) required for the objective 126 to produce a 3.6 microns rms spot diameter is less than about 4.2. For example, in one embodiment, the F number may be less than about 2.8 to enable sharp images for near infrared light.

Any known collection mechanism may be used with the objectives and systems of the invention to collect the scattered and/or emitted light from the specimen 124 and deliver the same to the detector 140. In certain embodiments, the detector 140 may be disposed within the probe 122 (distal end of the endoscope). Alternatively, the detector 140 may be disposed within the body (midsection or proximal end of the endo scope) and configured to receive the emitted or scattered light from the specimen 124 through the light delivery and collection subsystem. In addition to the fiber optic cables and the optical devices, the light delivery and collection subsystem may also include a notch or a cut filter (not shown) disposed adjacent to the detector 140 on a light-incident side and configured to block the scattered (reflected) excitation light.

A single detector 140 may be adapted to detect scattered and/or emitted light coming from the specimen 124. For example, the single detector detects white light reflected from the specimen 124 and luminescent light emitted via luminescence and generates a detector output signal in response to the detected light. The detector 140 may be generally formed by a plurality of detector elements (cells), which detect the scattered, reflected and/or emitted light. For example, the detector 140 may include multiple rows and/or columns of detector elements arranged in a two-dimensional array. Each detector element, when impacted by a light flux, produces an electrical signal proportional to the absorbed light flux at the position of the individual detector element in detector 140. These signals are acquired through read-out electronics or data readout circuitry (not shown) coupled to the detector cells. The signals may then be processed to reconstruct or generate an image of the specimen 124, as described below.

The illumination source is controlled by a system controller, which furnishes power, control signals and so forth for examination sequences. Moreover, the detector 140 is coupled to the system controller, which controls the acquisition of the signals generated in the detector 140. The system controller may also execute various signal processing and filtration functions, such as for initial adjustment of dynamic ranges, interleaving of digital image data, and so forth. In general, system controller commands operation of the endo-scope 120 to execute examination protocols and to process acquired data. In the present context, system controller may also include signal-processing circuitry, that may be based upon a general purpose or application-specific digital computer, and associated memory circuitry. The associated memory circuitry may store programs and routines executed by the computer, configuration parameters, and image data. For example, the associated memory circuitry may store programs or routines for reconstructing image from the detector output signal.

The system controller may include data acquisition circuitry for receiving data collected by readout electronics of the detector 140. In particular, the data acquisition circuitry typically receives sampled analog signals from the detector 140 and converts the data to digital signals for subsequent processing by a processor. The detector output signal may be transmitted to the system controller over a wired or a wireless link.

The processor is typically coupled to the system controller and may include a microprocessor, digital signal processor, microcontroller, as well as other devices designed to carry out logic and processing operations. The data collected by the data acquisition circuitry may be transmitted to the processor for subsequent processing such as reconstruction. For example, the data collected from the detector 140 may undergo pre-processing and calibration at the data acquisition circuitry within system controller and/or the processor to condition the data to represent the specimen 124. The processed data may then be reordered, filtered, and reconstructed to formulate an image of the imaged area. Once reconstructed, the image generated by the endo scope 120 reveals the specimen 124 which may be used for diagnosis, evaluation, and so forth.

The processor may comprise or communicate with a memory that can store data processed by the processor or data to be processed by the computer. It should be understood that any type of computer accessible memory device capable of storing the desired amount of data and/or code may be utilized by such an exemplary multi-mode endoscope 120. Moreover, the memory may comprise one or more memory devices, such as magnetic or optical devices, of similar or different types, which may be local and/or remote to the endo scope 120. The memory may store data, processing parameters, and/or computer programs comprising one or more routines for performing the reconstruction processes. Furthermore, memory may be coupled directly to system controller to facilitate the storage of acquired data.

The processor may also be adapted to control features enabled by the system controller, for example, acquisition. Furthermore, the processor may be configured to receive commands from an operator via an operator workstation, which may be equipped with a keyboard or other input devices. An operator may thereby control the endoscope 120 via the operator workstation. The operator may observe the reconstructed image and other data relevant to the system from operator workstation, initiate imaging, and otherwise control the system.

The endo scope 120 may be equipped with or connectable to a display unit or a printer. The display unit coupled to the operator workstation may be utilized to observe the reconstructed image. In one embodiment, the image may be displayed at a near video rate. Additionally, the image may be printed by the printer coupled to the operator workstation. The display unit and the printer may also be connected to the processor, either directly or via the operator workstation. Further, the operator workstation may also be coupled to a picture archiving and communications system (PACS). It should be noted that PACS might be coupled to a remote system, such as a radiology department information system (RIS), hospital information system (HIS) or to an internal or external network, so that others at different locations may gain access to the image data.

One or more operator workstations may be linked in the system for system controlling functions such as outputting system parameters, requesting examinations, viewing images. In general, displays, printers, workstations, and similar devices supplied with the system may be local to the data acquisition components, or may be remote from these components, such as elsewhere within an institution or hospital, or in an entirely different location, linked to the endo scope via one or more configurable networks, such as the internet or virtual private networks.

Generally, the present technique may be employed in a variety of medical and non-medical imaging contexts. Though the present discussion provides examples in context of endoscope, one of ordinary skill in the art will readily comprehend that the application of the techniques in other the objective of the present technique may be employed in other compact imaging systems such as a handheld probe, a borescope, a laparoscope handheld surgical systems, and other catheter based imaging probes.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A wide angle hybrid refractive-diffractive endo scope objective, comprising:
    a negative meniscus lens having a first surface and a second surface;
    a stop adjacent to the negative meniscus lens;
    a positive lens adjacent to the negative lens and having a first surface and a second surface; and
    a hybrid refractive-diffractive element adjacent to the positive lens and having a first surface and a second surface, wherein one of the first surface, or the second surface comprises a diffractive surface,
    wherein the objective has an effective focal length in a range from about 0.8 mm to about 1.6 mm.

2. The wide angle hybrid refractive-diffractive endoscope objective of claim 1, wherein the stop is located adjacent to the second surface of the negative meniscus lens.

3. The wide angle hybrid refractive-diffractive endoscope objective of claim 1, wherein the first surface of the positive lens is adjacent to the stop.

4. The wide angle hybrid refractive-diffractive endoscope objective of claim 1, wherein the hybrid refractive-diffractive element is adjacent to the positive lens.

5. The wide angle hybrid refractive-diffractive endoscope objective of claim 1, wherein other of the first or second surfaces comprise a spherical surface, or an aspherical surface.

6. The wide angle hybrid refractive-diffractive endoscope objective of claim 1, wherein the first surface of the hybrid refractive-diffractive element is an aspherical surface, and the second surface is a diffractive surface.

7. The wide angle hybrid refractive-diffractive endoscope objective of claim 1, wherein the hybrid refractive-diffractive element is plastic.

8. The wide angle hybrid refractive-diffractive endoscope objective of claim 1, wherein a full field of view is in a range from about 60 degrees to about 170 degrees.

9. The wide angle hybrid refractive-diffractive endoscope objective of claim 1, wherein an effective focal length of the hybrid refractive-diffractive element is greater than about 1 mm.

10. The wide angle hybrid refractive-diffractive endoscope objective of claim 1, wherein the first surface of the positive lens is a planar surface.

11. The wide angle hybrid refractive-diffractive endoscope objective of claim 1, wherein the first surface of the meniscus lens is convex.

12. The wide angle hybrid refractive-diffractive endoscope objective of claim 1, further comprising an aperture stop between the meniscus lens and the positive lens.

13. The wide angle hybrid refractive-diffractive endoscope objective of claim 1, wherein an entrance pupil diameter of the endo scope objective is greater than 0.6 mm.

14. The wide angle hybrid refractive-diffractive endoscope objective of claim 1, wherein the endoscope objective is configured to capture fluorescence signal for visible wavelength, or near infrared wavelength, or both.

15. The wide angle hybrid refractive-diffractive endoscope objective of claim 1, further comprising an optical filter comprising a laser rejection filter, an emission filter, or both.

16. A wide angle hybrid refractive-diffractive endo scope objective, comprising:
- a negative meniscus lens having a first surface and a second surface;
- a stop adjacent to the negative meniscus lens;
- a positive lens adjacent to the negative lens and having a first surface and a second surface; and
- a hybrid refractive-diffractive element adjacent to the positive lens and having a first surface and a second surface, wherein one of the first surface, or the second surface comprises a diffractive surface,
- wherein the objective has an effective focal length in a range from about 0.8 mm to about 1.6 mm, and wherein the objective is employed in an endoscope, a handheld probe, or a borescope.

17. A system for optical imaging, comprising:
an optical endo scope comprising:
one or more illumination sources for producing a visible light and an excitation light, wherein the excitation light is configured to induce luminescence in an specimen;
an objective for directing the visible light and the excitation light in a direction of the specimen, wherein the objective comprises:
- a negative meniscus lens having a first surface and a second surface;
- a stop adjacent to the negative meniscus lens;
- a positive lens adjacent to the negative lens and having a first surface and a second surface;
- a hybrid refractive-diffractive element adjacent to the positive lens and having a first surface and a second surface, wherein one of the first surface, or the second surface comprises a diffractive surface,
- wherein the objective has an effective focal length in a range from about 0.8 mm to about 1.6 mm;
a single detector in operative association with the one or more illumination sources for detecting luminescent light and visible light emitted from the specimen; and
a signal processor for processing signals corresponding to the endoscope.

* * * * *